Nov. 11, 1969    M. W. LUNDGREEN ETAL    3,478,355
ECHO FALSE DISTANCE INDICATION PREVENTION CIRCUIT FOR
AIRCRAFT DME AND TACAN
Filed Sept. 5, 1968    4 Sheets-Sheet 1

INVENTORS
MICHAEL W. LUNDGREEN
JOHN B. MAJERUS
EDWARD G. TUTHILL

BY
ATTORNEY

INVENTORS
MICHAEL W. LUNDGREEN
JOHN B. MAJERUS
EDWARD G. TUTHILL
BY *Warren H. Kintzinger*
ATTORNEY

United States Patent Office 3,478,355
Patented Nov. 11, 1969

3,478,355
ECHO FALSE DISTANCE INDICATION PREVENTION CIRCUIT FOR AIRCRAFT DME AND TACAN
Michael W. Lundgreen, Edward G. Tuthill, and John B. Majerus, Marion, Iowa, assignors to Collins Radio Company, Cedar Rapids, Iowa, a corporation of Iowa
Filed Sept. 5, 1968, Ser. No. 757,585
Int. Cl. G01s 9/02
U.S. Cl. 343—7.3                                13 Claims

ABSTRACT OF THE DISCLOSURE

A false distance indication sensing and correction circuit for aircraft radio distance measuring systems, such as DME, with a linear sweep voltage generator starting from a voltage (generally zero volts) equivalent to substantially zero range when the DME switches from search to track subject to being disabled whenever the DME is again in search. It is an echo protection circuit sweeping outward in an increasing range direction, normally to the DME range gate, to then be recycled back for repeated outward sweeps, except when the DME range gate is locked-on an echo return in which case the echo protection circuit upon encountering a DME return signal for more than a predetermined approximately one second interval initiates slew return of the DME back to zero range and search.

---

Figure 1:
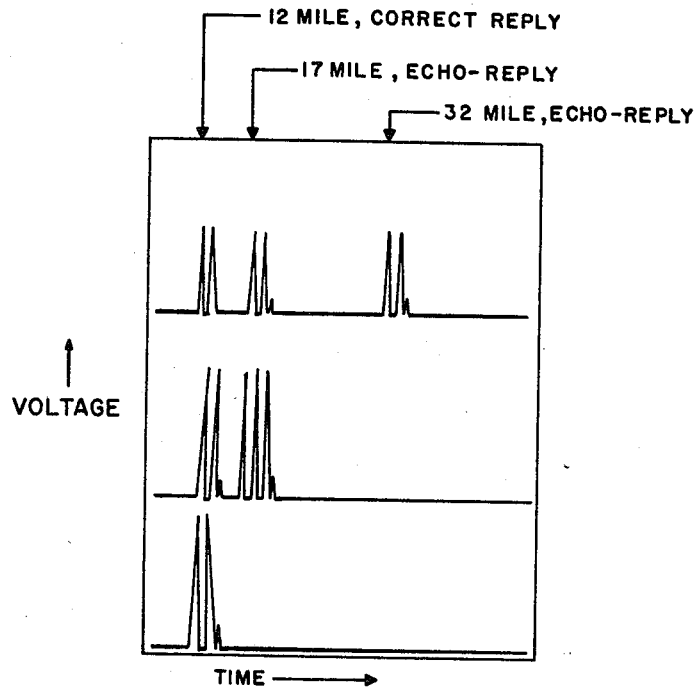

This invention relates in general to aircraft radio distance measuring systems, and in particular, to an echo false distance indication sensing and correcting circuit.

In aircraft distance measuring systems, be it DME or tacan or any other such distance measuring system, the slant range from the aircraft to any one particular ground station being selectively interrogated is determined by measuring the time delay between the moment of transmission of interrogation pulses by the airborne DME or tacan radio system and the receiving of the interrogation response reply pulses transmitted by the ground station. A sometimes dangerous condition, or at least potentially dangerous condition, may come into existence if, for example, a DME or tacan radio system searching in the outbound direction fails to lock-on to the correct reply pulse and instead locks-on to a reply initiated by an echo of the air-to-ground station signal trånsmission. Although such echo signals may be quite weak, the receivers of ground stations are very sensitive to quite a range of weak aircraft transmitted signals and the ground station dutifully reacts at times to weak echo signals and rebroadcasts a full strength return pulse signal. These echo delays come about since the signal path to an object and a resulting reflection from that object to the ground station being interrogated is much longer than the true direct distance from the aircraft transmitter to the ground station. Through experience, it has been found that such troublesome echo reply pulses when experienced generally fall in a delay range, as translated to increased distance, from approximately 5 miles to as much as 40 miles greater range than a correct reading provided in response to a correct reply pulse signaling from the ground station being interrogated. Obviously, such echo reply erroneous signalling is dependent in great measure upon the particular terrain and signal reflecting objects within effective signal echo return proximity to the ground station concerned, and at times, may even contribute to more than one echo return signal pulse simultaneously being generated from the interrogation signals transmitted from the aircraft.

It is, therefore, a principal object of this invention to provide an echo false distance indication correction circuit for aircraft DME or tacan systems.

A further object with such an echo protection circuit is to prevent DME or tacan radio from being locked-on an echo reply for more than a predetermined very short interval of time and to minimize, or possibly eliminate, false distance indication.

Features of the invention useful in accomplishing the above objects include, in an echo false distance indication sensing and correcting circuit for aircraft DME or tacan radio distance measuring systems, a protection circuit with a linear sweep voltage generator starting from zero volts, equivalent to substantially zero range, when the DME or equivalent system switches from search to track, and with this echo protection circuit being disabled when the DME is in search. With this system, the echo protection circuit sweeps outward, that is in an increasing range direction, until there is a coincidence with a reply pulse and then the sweep voltage is stopped, a lock-on circuit is activated triggering the DME inbound, and thereupon initiates a new search cycle if generally, in fact, the DME range gate is locked-on to an echo reply. During normal operation when the return is correct, the echo protection circuit range gate searches for a reply pulse from the equivalent of zero miles out to the DME range gate where they come into coincidence. Then the linear sweep voltage generator is reset to zero volts, thereby resetting the echo protection circuit range gate again to the equivalent of zero miles range in a continuously recycling action for the echo protection circuit so long as the DME is locked-on the correct return. Please note that since the echo reply pulses are always further outbound than a correct ground station reply, the echo protection circuit range gate can lock-on to the correct reply pulse only when the DME is locked-on to an echo reply pulse.

A specific embodiment that is presently regarded as the best mode of carrying out the invention is illustrated in the accompanying drawings.

Figure 2:
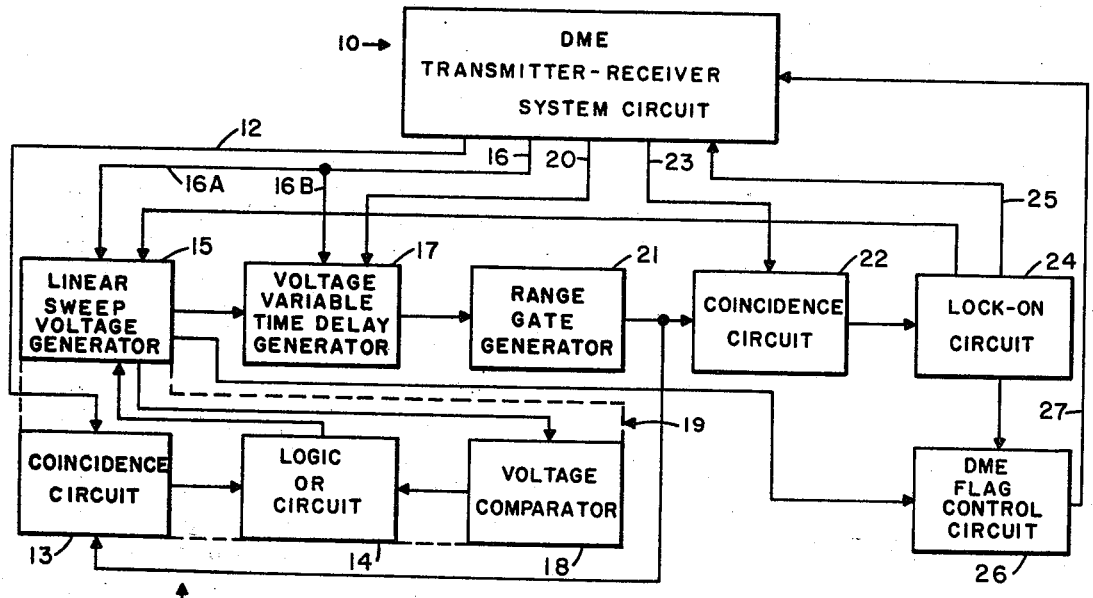
Figure 3A:
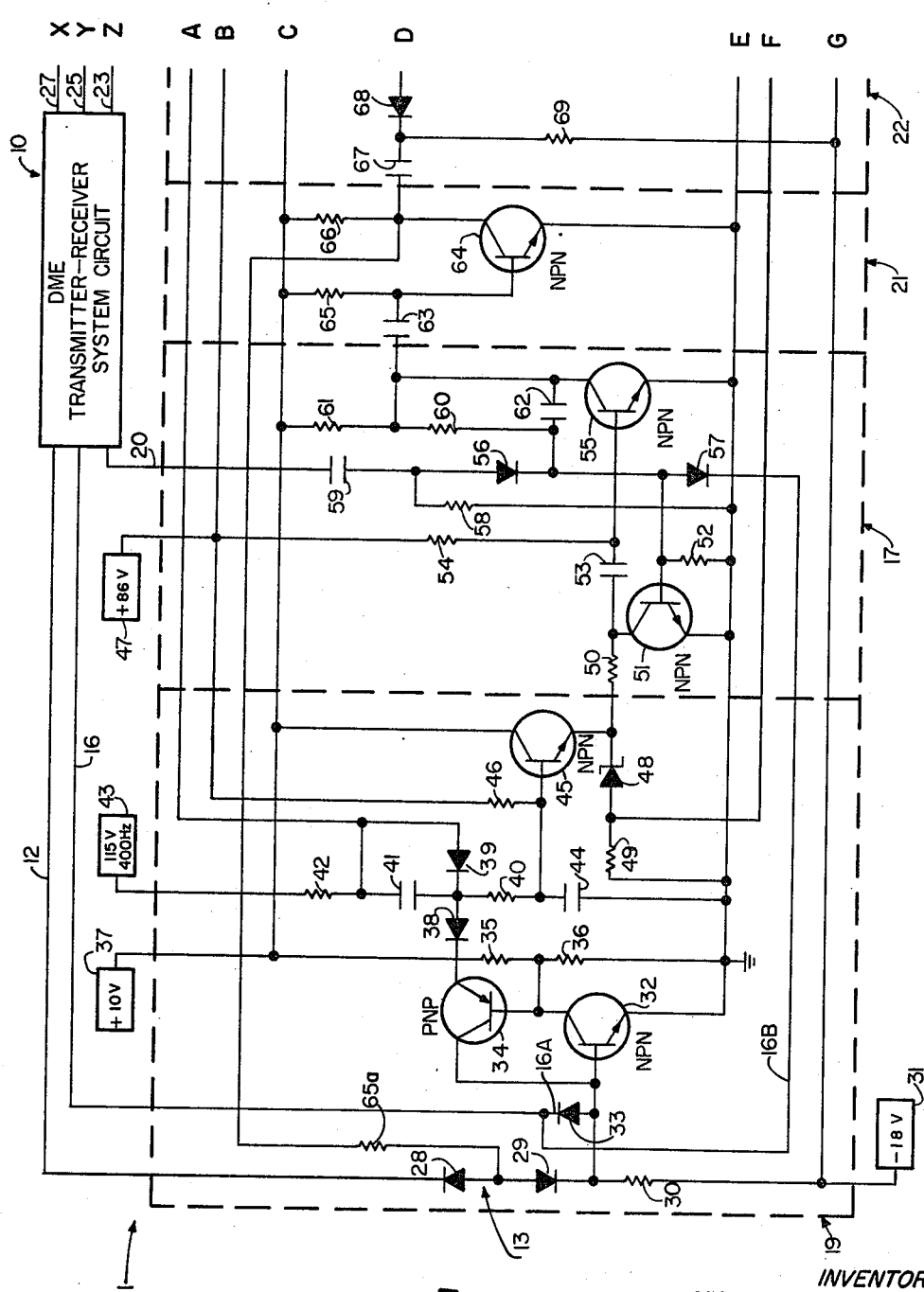
Figure 3B:
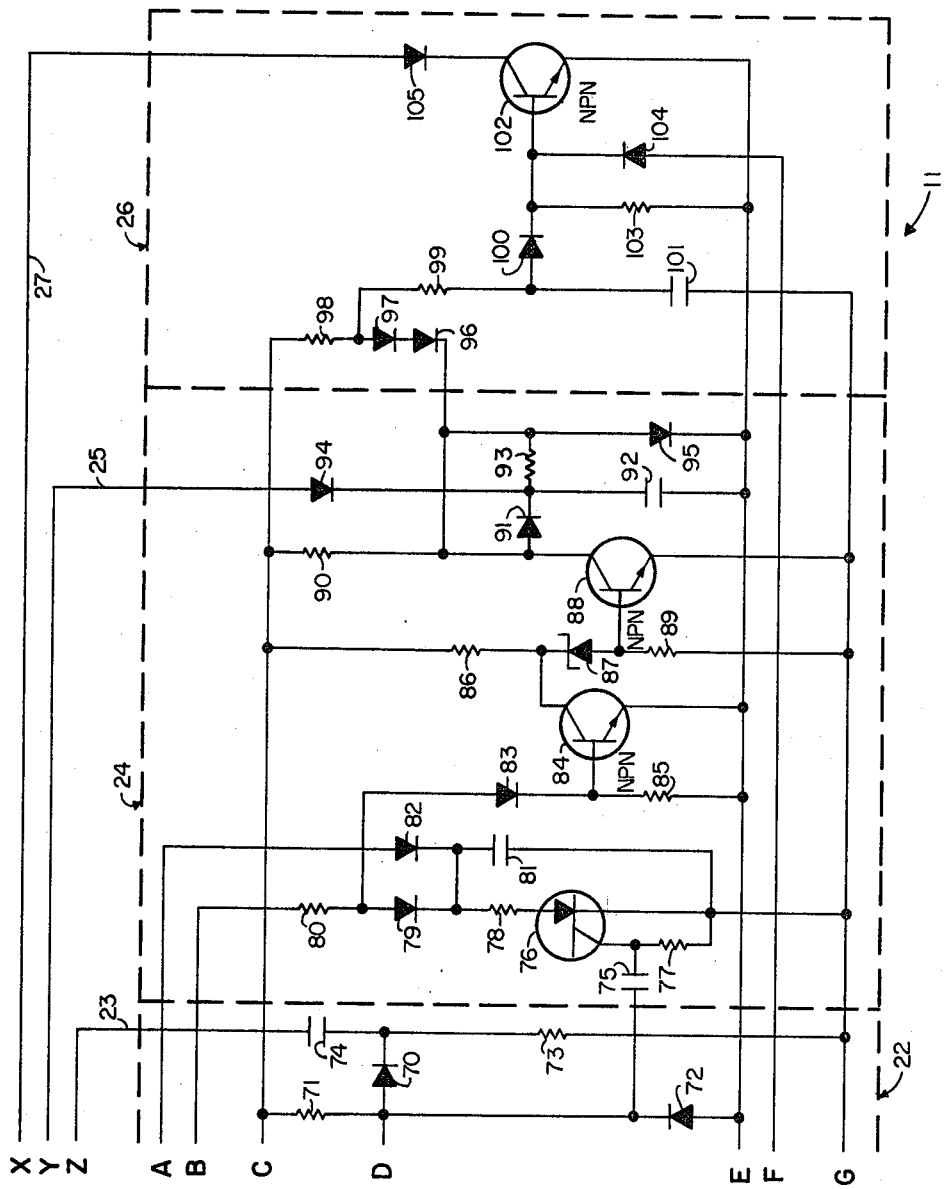
Figure 4:
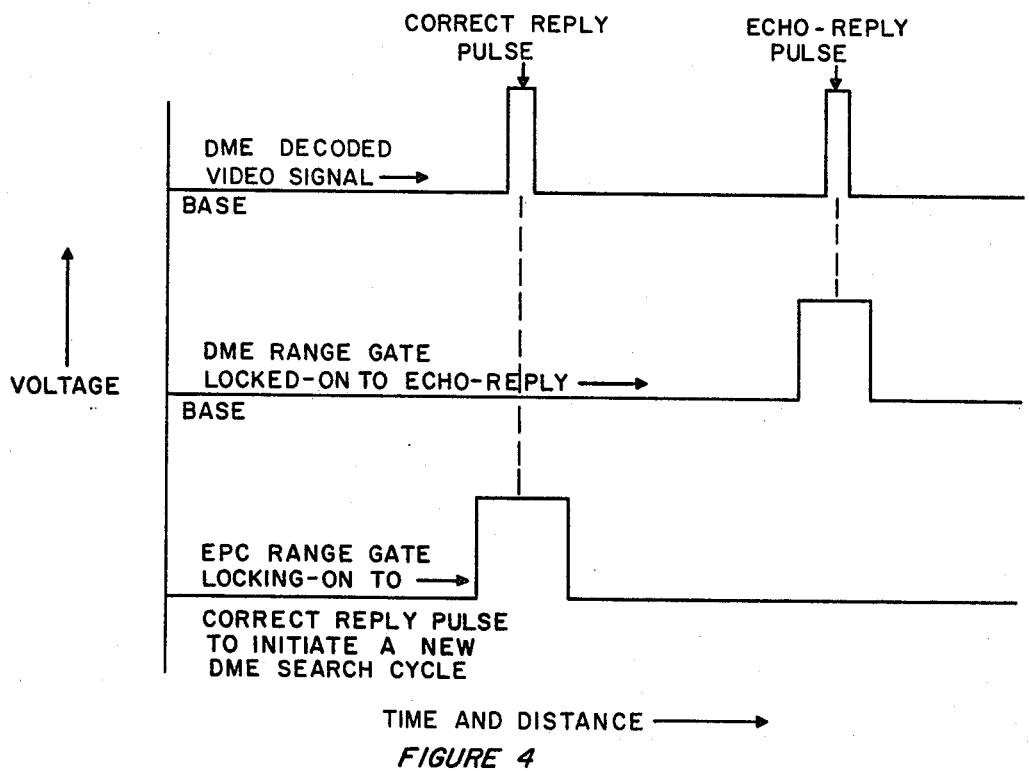

In the drawings:

FIGURE 1 represents three traces duplicating an oscilloscope presentation of the video amplifier signal with the top trace including the correct reply and two echo replies, the second trace including the correct reply and one echo reply, and the third trace just solely the correct reply;

FIGURE 2, a block diagram of the echo protection circuit as related to a DME transmitter-receiver system;

FIGURES 3A and 3B, a schematic of the echo protection circuit set forth in block diagram form in FIGURE 2; and FIGURE 4, is a graph of first, at the top, the DME decoded video signal, second the DME range gate locked-on to the echo reply, and the echo protection range gate locked-on to the correct reply pulse to initiate a new DME search cycle when it is not coincident with the DME range gate locked-on echo reply.

Referring to the drawings:

FIGURE 1 illustrates a condition with the top trace a correct reply video signal at approximately 12 miles, an echo reply video signal at approximately 17 miles and an additional echo reply video signal at approximately 32 miles. The second trace has the correct video response at approximately 12 miles just as with the top trace, and also an echo reply video response indication at approximately 17 miles while the third and bottom trace indicates just solely a correct reply video pulse at approximately 12 miles. It would be fine if all video triggered response traces were as indicated in trace 3, however, the condition of the first and second traces are encountered far too often and, as pointed out hereinbefore, this leads to, at times, a dangerous condition of false distance reading in DME or tacan or other such distance measuring radio systems.

With the DME transmitter-receiver system circuit 10 of FIGURE 2, an echo protection circuit 11 is shown in block diagram form. The DME system circuit 10 provided has circuit connections compatible with the lead connections shown from the DME block indicated that are consistent with schematics and other drawings shown and well known to those skilled in the art of, for example, Collins Radio Company's 860E–2 DME equipment, commercially available on the market, as set forth and referred to in the sixth revision Overhaul Manual therefore carrying the identification number 523, 0755 913 or in the corresponding Maintenance Manual therefore, fifth revision, carrying the identification number 523 0755 912. Among these connections from the DME system circuit 10, DME range gate pulse line 12 provides for DME pulse range gate input to coincidence circuit 13, the output of which is connected as an input logic "or" circuit 14 from which an output is connected as an input to linear sweep voltage generator 15. A DME search to track signal enable for echo protection line output 16 from the DME system circuit 10 has a branch 16A connected as an additional input to linear sweep voltage generator 15, and a branch 16B connected as an input to voltage variable time delay generator 17. The linear sweep voltage generator circuit 15 has an output connection as an input to the voltage variable time delay generator 17 and also an output connection as an input to voltage comparator circuit 18, the output of which is connected as an additional input to the logic "or" circuit 14. The coincidence circuit logic "or" gate 14, linear sweep voltage generator 15, and voltage comparator 18 are indicated as being in cooperating overall subcircuit 19 since various circuit elements to a greater or lesser extent perform dual sub-functions for two or more respective subcircuits. A transmitter trigger pulse output line 20 from the DME system circuit 10 is applied as an additional input to voltage variable time delay generator 17, the output from which is applied as an input to range gate generator 21. The output from range gate generator 21 is applied as a second input to coincidence circuit 13 and also as a first input to the second coincidence circuit 22. The second input to the coincidence circuit 22 is decoded video pulse line 23 from DME transmitter-receiver system circuit 10. The output of coincidence circuit 22 is applied as an input to lock-on circuit 24 having an inbound DME slew control signal output line 25 applied as an input to a suitable control point in the DME transmitter-receiver circuit 10. An additional output of the lock-on circuit 24 is applied as an input to DME flag control circuit 26 also receiving as a second input an additional output from the linear sweep voltage generator 15 for developing an output on line 27 connected as a flag control input line to the DME transmitter-receiver system circuit 10.

Referring now for greater detail to the schematic of FIGURES 3A and 3B, the DME range gate pulse input line 12 is connected to the cathode of diode 28 and through the diode 28 to the anode of diode 29 and through diode 29 and serially through resistor 30 to the −18 volt voltage supply 31. The common junction of the cathode of diode 29 and resistor 30 is connected to the base of NPN transistor 32. The 16A line extension of DME search to track enable for echo protection line 16 is connected to the cathode of diode 33 and through the diode 33 also to the base of transistor 32 and also to the common junction of diode 29 and resistor 30. The emitter of NPN transistor 32 is connected to ground while the collector thereof is connected to the base of PNP transistor 34, the collector of which is also connected to the common junction of the base of NPN transistor 32, diodes 29 and 33, and resistor 30. The collector of transistor 32 to base of transistor 34 connection is connected to the common junction of resistors 35 and 36, serially connected between positive 10 volt voltage supply 37 and ground. The emitter of PNP transistor 34 is connected to the cathode of diode 38, the anode of which is connected in common to the cathode of diode 39, resistor 40, and capacitor 41. Capacitor 41 is also connected through resistor 42 to 115 volt 400 Hz. power supply 43, and the junction of capacitor 41 and resistor 42 is connected to the anode of diode 39 and also, as an input to the linear sweep voltage generator 15, it is provided with a connection from lock-on circuit 24. The end of resistor 40, opposite from the end connected to the junction of diodes 38 and 39, is connected through capacitor 44 to ground, and the junction of resistor 40 and capacitor 44 is connected to the base of NPN transistor 45 and also through resistor 46 to positive 86 volt supply 47. The collector of NPN transistor 45 is connected to the positive voltage supply 37 while the emitter thereof is connected to the cathode of Zener diode 48, the anode of which is connected as an input to the DME flag control circuit 26 and also through resistor 49 to ground.

The junction of the emitter of NPN transistor 45 and the cathode of Zener diode 48 is connected through resistor 50 to the collector of NPN transistor 51, the emitter of which is connected to ground and the base of which is connected through resistor 52 to ground. The collector of transistor 51 is also connected through capacitor 53 and resistor 54 to positive voltage supply 47, and the junction of capacitor 53 and resistor 54 is connected to the base of NPN transistor 55. The base of NPN transistor 51 is connected to the junction of the cathode of diode 56 and the anode of diode 57, and through diode 57 to the 16B lead extension of the line 16 connection with the DME system circuit 10. The anode of diode 56, however, is connected through resistor 58 to ground and also through capacitor 59 to the transmitter trigger pulse line 20 from the DME system circuit 10. The common junction of the base of NPN transistor 51 and diodes 56 and 57 is also connected serially through resistors 60 and 61 to the positive voltage supply 37, and a capacitor 62 is connected in parallel with resistor 60 and the junction of resistors 60 and 61 is also connected to the collector of the NPN transistor 55, the emitter of which is connected to ground. The collector connection thereof and the common junction of resistors 61 and 62 is also connected as an input connection to range gate generator 21 to and through capacitor 63 to the base of NPN transistor 64, the base of which is also connected through resistor 65 to the positive voltage supply 37. The emitter of transistor 64 is connected to ground while the collector thereof is connected back as a second input to coincidence circuit 13 through resistor 65A to the anode of diode 29 and also through resistor 66 to positive voltage supply 37.

The collector output of transistor 64 is also connected as an input to the second coincidence circuit 22 to and through capacitor 67 to the junction of the cathode of diode 68 and resistor 69 and through the resistor 69 to the negative voltage supply 31. The anode of diode 68 is connected to the common junction of the anode of diode 70, resistor 71, and through resistor 71 to the positive voltage supply 37. The common junction of diodes 68 and 70 is also connected to the cathode of diode 72 and through the diode 72 to ground. The cathode of diode 70 is connected through resistor 73 to the negative voltage supply 31 and also through capacitor 74 to the decoded video pulse line 23 from the DME transmitter-receiver system circuit 10. The common junction of diodes 68, 70, and 72 is also connected as an output from the coincidence circuit 22 and input to and through capacitor 75 of lock-on circuit 24 and with this connection through capacitor 75 being to the control element of silicon controlled rectifier 76 and also through resistor 77 to the negative voltage supply 31. The cathode of the silicon controlled rectifier 76 is connected to −18 volts, and the anode thereof is connected through resistor 78 to the cathode of diode 79 through the diode 79 and serially on through resistor 80 to the positive voltage supply 47. The common junction of resistor 78 and diode 79 is connected through capacitor 81 to the negative voltage supply 31 and also to the cathode of diode 82 and through diode 82 as a return signal connection to the diode 39.

The common junction of the anode of diode 79 and resistor 80 is connected to the anode of diode 83 and through diode 83 to the junction of the base of NPN transistor 84 and resistor 85 through the resistor 85 to ground. The emitter of NPN transistor 84 is also connected to ground while the collector thereof is connected both through resistor 86 to positive voltage supply 37 and to the cathode of Zener diode 87 and through the Zener 87 to the junction of the base of NPN transistor 88 and resistor 89 and through the resistor 89 to negative voltage supply 31. The emitter of transistor 88 is connected to the negative voltage supply 31 while the collector thereof is connected through resistor 90 to positive voltage supply 37. The collector is also connected to the anode of diode 91 and through the diode 91 to the common junction of capacitor 92, resistor 93, and the cathode of diode 94. This common junction is connected through capacitor 92 to ground and through the diode 94 as the inbound DME slew control signal line 25 connection to the DME transmitter-receiver system circuit 10. The other end of resistor 93 is directly connected to the collector of transistor 88 and also to the anode of diode 95 and through diode 95 to ground.

The collector of transistor 88 is also connected as an output from the lock-on circuit and as input to the DME flag control circuit to the cathode of diode 96, and serially through diode 96, like oriented diode 97, and resistor 98 to the positive voltage supply 37. The common junction of the anode of diode 97 and resistor 98 is connected through resistor 99 to the junction of the anode of diode 100 and capacitor 101 and through the capacitor 101 to negative voltage supply 31. The signal path from the common junction of resistor 99, diode 100, and capacitor 101 continues through diode 100 to the base of NPN transistor 102 with the junction of diode 100 and the base of transistor 102 connected through resistor 103 to ground and also to the cathode of diode 104 and through the diode 104 for receiving an additional signal input for the DME flag control circuit 26 from linear sweep voltage generator circuit 15. The emitter of NPN transistor 102 is connected to ground while the collector thereof is connected to the cathode of diode 105 and through the diode as an output from the DME flag control circuit 26 to line 27 as the flag control signal input to the DME transmitter-receiver system circuit 10.

The echo protection circuit 11 prevents the DME or tacan radio system 10 from being locked-on, in one specific embodiment thereof that has been built and operating for sometime heretofore, to an echo reply pulse for more than at most approximately 10 seconds. When the echo protection circuit 11 operationally determines that the radio system is locked-on to an echo reply pulse, the DME or tacan system is triggered to slew inbound to the equivalent of substantially zero miles and with the transmitter simultaneously turned off. The transmitter is then turned on again as search outbound is initiated to, generally, arrive at and achieve lock-on to the correct reply pulse.

Operation of the echo protection circuit 11 with a DME or tacan transmitter-receiver system circuit 10 is such that when the DME is in search, the echo protection circuit is disabled. The linear sweep voltage generator 15 starts from substantially zero volts when the DME switches from search to track, and as the voltage increases on the voltage variable time delay generator 17, the range gate 21 in the echo protection circuit 11 sweeps outbound. When the echo protection circuit range gate 21 is coincident with a synchronous reply pulse, the sweep voltage is stopped and the lock-on circuit 24 is activated, thereby also triggering the DME or tacan inbound for initiation of a new search cycle if, in fact, the DME range gate is locked-on to an echo reply. In the normal mode of operation, the echo protection range gate searches for a synchronous reply pulse from zero miles out to the DME range gate. Then when the two range gates comes into coincidence, the linear sweep voltage generator 15 is reset to substantially zero volts, thereby resetting the echo protection circuit range gate 21 can locked-on to the correct reply pulse only when the echo reply pulses are always further outbound than the correct reply pulse, that the echo protection range gate 21 can lock-on to the correct reply pulse only when the DME or tacan is locked-on to an echo reply pulse. FIGURE 4 is illustrative of this operational condition with the graph plot at the top including a DME decoded video signal correct reply pulse and an echo reply pulse, with the second plot showing a DME range gate locked-on to an echo reply, and with an echo protection circuit range gate in the third graph plot in a locked-on to correct reply pulse position to thereby initiate a new DME search cycle.

In order to more thoroughly understand operation of this system, realize that the search mode is when DME or tacan is looking for a synchronous reply signal and that track is the mode of operation when DME or tacan is displaying range of a synchronous reply signal. In considering operation first of the linear sweep voltage generator 15, the voltage comparator 18, coincidence circuit 13, and the logic "or" circuit 14 together with, first the transmitter-receiver system 10 in the search mode of operation, and approximately —1.5 volts applied to the cathode of diode 33, current is pulled from the collector of transistor 34 and transistor 32 is held "off" since its base is relatively negative. With transistor 32 in the nonconductive "off" state, capacitor 44 is charged positive by half-wave AC current from AC supply 43 transmitted through resistor 42, diode 39, and resistor 40. When the voltage on the anode of diode 38 exceeds the voltage on the collector of transistor 32 by the drop across diode 38 and the emitter base junction of transistor 34 in series therewith, current then flows through transistor 34 and diode 33. This is a restive state for this circuit that exists during the search mode, with echo protection circuit 11 off, of the DME transmitter-receiver system circuit 10. When the DME transmitter-receiver circuit goes into the track mode of operation, the cathode of diode 33 is raised to approximately +3.5 volts at which level transistor 34 is activated to pass current to thereby turn "on" transistor 32 which then holds "on" transistor 34. This operational state then allows capacitor 44 to discharge through resistor 40, diode 38, transistor 34, and transistor 32. The capacitor 41 across diode 39 couples some AC to the anode of diode 38 to turn "off" transistor 34 and transistor 32 after capacitor 44 is substantially completely discharged.

Considering now the DME track mode of operation and assuming that there is, initially at the start of this operational mode, no voltage on capacitor 44, the capacitor 44 is charged slowly positive by half-wave current from AC power supply 43 through resistor 42, diode 39, and resistor 40. The charge rate in this action is about 1.5 volts per second continuing until any one of three things happen. First, the anode of diode 39 could be pulled negative by the lock-on circuit 24 resulting in a turn "off" of the charging current to capacitor 44 and preservation of the sweep voltage at a constant level for approximately 100 milliseconds. The second possibility is that, the DME range gate trigger could be coincident with the echo protection circuit range gate resulting in the gating of a positive pulse through diode 29 and thereby a turn "on" of transistor 32 and transistor 34 to cause the capacitor 44 to be thereby discharged through resistor 40, diode 38, transistor 34 and transistor 32. The third alternative is that existing with voltage on capacitor 44 possibly exceeding the voltage divider voltage of resistors 35 and 36 on the collector of transistor 32 by more than serially the voltage drop across diode 38 and the emitter base junction of transistor 34 to thereby turn "on" transistor 34 and transistor 32 and causing capacitor 44 to be thereby discharged as described hereinbefore. It is interesting to note that resistor 46 permits a slight positive current flow from the positive 86 volt supply to flow to capacitor 44 in compensation for the base current of transistor 45. Further, if something malfunctions and capacitor 44 becomes charged up to approximately +10 volts, a positive voltage is fed through Zener diode 48 to the flag control circuit 26.

With reference at this point to the voltage variable time delay generator 17, when the DME transmitter-receiver system circuit 10 is in the search mode of operation and with approximately −1.5 volts on the cathode of diode 57 as applied through the DME search to track signal enable for echo protection lines 16 and 16B, transistor 51 is held "off" even though triggers are being applied through diode 56 from the transmitter trigger pulse line 20 and DME circuit 10 with, as a result, transistor 51 held "off," transistor 55 remaining "on," and no pulses being sent to the range gate generator 21. In the DME track mode, however, approximately +3.5 volts is applied to the cathode of diode 57 and initiating first trigger gates are applied through the transmitter trigger pulse line 20 from the DME transmitter-receiver system circuit 10 to the base of transistor 51 through diode 56. This results in turn "on" of transistor 51, and resultant turn "off" of transistor 55 through the negative voltage step through the capacitor 53. The resistor 60 in the collector of transistor 55 keeps transistor 51 "on" until capacitor 53 is charged up to the equivalent of the emitter base voltage drop of transistor 55 at which time transistor 55 is turned back "on." The resulting positive output pulse width varies linearly with the sweep voltage since the current through the resistor 54 from positive voltage supply 47 approaches the equivalent of a constant current source. It may be of interest to refer at this point if desired to a co-pending application entitled, "A Voltage Variable Pulse Delay Monostable Multivibrator," by one of the co-inventors hereof, Michael W. Lundgreen, U.S. application Ser. No. 641,213, filed May 25, 1967.

With reference now to range gate generator 21 with the DME transmitter-receiver system circuit 10 in the search mode of operation, there are no variable width pulses applied to capacitor 63, and therefore transistor 64 is held "on" by voltage applied from positive voltage supply 37 through resistor 65, and therefore no echo protection circuit 11 range gates are generated during this search mode of operation. During the track mode of operation, however, there is a positive pulse applied to capacitor 63 and the echo protection circuit range gate is then initiated by the trailing edge of the pulse. The sweep voltage varies the width of the variable width pulse that in turn varies the time delay between the first or number one trigger gate and the echo protection circuit range gate. The amplitude of the variable width pulse, the value of resistor 65, and the value of capacitor 63 control the echo protection circuit range gate to approximately 30 microseconds width.

With reference also to coincidence circuit 22, please note that this particular circuit is a capacity coupled AND circuit, with it being required that pulses be coincident from both of the inputs in order to enable an output pulse. Diodes 68 and 70 form the AND circuit while diode 72 is a clamping diode circuit oriented for holding the zero output level at approximately −0.5 volt.

With respect to the lock-on circuit 24 with no activating pulses being applied to the control electrode of silicon controlled rectifier 76, transistor 84 is "on" and transistor 88 maintained in the "off" state with as a result +0.5 volts being developed on capacitor 92. When a video pulse is coincident with an echo protection circuit range gate, the silicon controlled rectifier 76 is triggered "on" in which operational state the resulting DC current through resistor 80 is less than the holding current of the silicon controlled rectifier 76 to result in turn "off" thereof and resulting charge-up of capacitor 81 toward the positive voltage supply 47 until it is clamped at approximately +0.5 volts by diode 83 and transistor 84. When the silicon controlled rectifier 76 is triggered "on," capacitor 81 is discharged to thereby turn "off" transistor 84. The circuit time constant for capacitor 81 is determined by the value thereof, resistor 80 and resistor 42 connected to the AC voltage supply 43, and is designed to generate approximately a 100 millisecond positive pulse at the collector of transistor 84. This results in turn "on" of transistor 88 for approximately a 100 millisecond period each time a video is coincident with the echo protection circuit range gate. When a synchronous reply is coincident with the echo protection circuit range gate, transistor 88 is held "on" thereby allowing capacitor 92 to charge toward the negative voltage supply 31 through resistor 93 and when capacitor 92 reaches a predetermined negative voltage charge of approximately −10 volts, the DME circuit 10 is triggered into the search mode of operation. The circuit time constant for this is predetermined to take approximately 1 second before triggering of DME to slew inbound. Each time the silicon controlled rectifier 76 is triggered, diode 82 is pulled to the negative voltage value of negative voltage supply 31 in order to stop the sweep voltage. This enables the echo protection circuit range gate to look at least three times at a video interception before continuing to sweep outbound if it is not a reply. However, when a valid reply is encountered, capacitor 81 is continually retriggered to the negative voltage of negative voltage supply 31 to stop the sweep voltage while capacitor 92 charges to a predetermined negative voltage value for triggering the DME inbound.

Referring finally to the DME flag control circuit 26 for a circuit provided for monitoring echo protection circuit 11 operation that will flag the DME or tacan transmitter-receiver system circuit 10 when most echo protection circuit 11 failures occur. When the sweep voltage exceeds a predetermined amount, +9 volts for example, transistor 102 is turned "on" and flags the DME at a display location. If no video pulses are ever coincident with the echo protection circuit range gate or if something fails in such a way as to turn transistor 88 "off" all the time, capacitor 101 charges from the negative voltage of negative voltage supply 31 toward the positive voltage value of positive voltage supply 37 through the resistor 98 and then, when capacitor 101 is sufficiently positive as to over balance the voltage drop through diode 100 and the emitter base junction of transistor 102, the transistor 102 is turned "on" and flags the DME display.

Components and values used in an echo protection circuit 11, providing operational results that have been described hereinbefore and according to the invention, include the following:

Diodes 28, 29, 33, 56, 57, 68, 70, 72, 79, 83, 91, 94, 95, 96, 97, 100, 104, and 105 _ 1N3064.
Diodes 38, 39, and 82 _____ 1N645.
Zener diode 48 _____ 1N756, 8.2 volts.
Zener diode 87 _____ 1N969, 22 volts.
Capacitor 41 _____ 0.01 microfarad.
Capacitor 44 _____ 270 microfarads, 15 volts.
Capacitor 53 _____ 0.02 microfarad.
Capacitor 59 _____ 100 picofarads.
Capacitor 62 _____ 220 picofarads.
Capacitor 63 _____ 1,000 picofarads.
Capacitors 67, 74, and 75 ___ 1 microfarad, 35 volts.
Capacitor 81 _____ 4.7 microfarads, 35 volts.
Capacitor 92 _____ 270 microfarads, 15 volts.
Capacitor 101 _____ 100 microfarads, 25 volts.
Resistor 30 _____ 180K ohms.
Resistors 35, 52, and 58 ____ 10K ohms.
Resistor 36 _____ 28.7K ohms.
Resistors 40 and 99 _____ 47 ohms.
Resistor 42 _____ 75K ohms.
Resistor 46 _____ 10 megohms.
Resistors 49 and 90 _____ 4.7K ohms.
Resistors 50 and 85 _____ 100K ohms.

| Component | Value |
|---|---|
| Resistor 54 | 750K ohms. |
| Resistor 60 | 33K ohms. |
| Resistors 61 and 71 | 6.8K ohms. |
| Resistor 65 | 61.9K ohms. |
| Resistor 65A | 12K ohms. |
| Resistor 66 | 2.7K ohms. |
| Resistors 69, 73, and 93 | 8.2K ohms. |
| Resistor 77 | 1K ohms. |
| Resistor 78 | 56 ohms. |
| Resistor 80 | 820K ohms. |
| Resistor 86 | 5.6K ohms. |
| Resistor 89 | 2.2K ohms. |
| Resistor 98 | 82K ohms. |
| Resistor 103 | 220K ohms. |
| PNP transistor 34 | 2N2907A. |
| NPN transistors 32, 45, 55, 64, 84, 88, and 102 | 2N956. |
| NPN transistor 51 | 2N706. |
| AC voltage supply 43 | 115 volts, 400 Hz. |
| Voltage supply 31 | −18 volts. |
| Positive voltage supply 37 | +10 volts. |
| Positive voltage supply 47 | +86 volts. |
| Silicon controlled rectifier 76 | 2N886. |

Whereas this invention is herein illustrated and described with respect to a single embodiment thereof, it should be realized that various changes may be made without departing from the essential contributions to the art made by the teachings hereof.

We claim:

1. An echo false distance indication sensing and correcting circuit for an aircraft radio transmitter-receiver distance measuring system having a range gate signal pulse connection, a search to track signal connection, a transmitter trigger pulse connection, a decoded video pulse connection, and an inbound slew control connection; and having: a first signal coincidence circuit connected for receiving an input from said range gate signal pulse connection; sweep voltage generating means; circuit means interconnecting said first signal coincidence means and said sweep voltage generating means; said sweep voltage generating means being also connected to said search to track signal connection; a voltage variable time delay generator connected for receiving inputs from said search to track signal connection, said transmitter trigger pulse connection, and an output signal from said sweep voltage generating means for developing an output; a range gate generator connected for receiving the output of said voltage variable time delay generator and having an output connection to said first coincidence circuit, and also connection of the output to a second coincidence circuit; said second coincidence circuit also being connected to said decoded video pulse connection and having output means; a lock-on circuit connected to the output means of said second coincidence circuit and having first signal output means connected as an input to said linear sweep voltage generator; and with said lock-on circuit also having a second signal output means connected to said inbound slew control connection.

2. The echo false distance indication sensing and correcting circuit of claim 1, wherein a flag control system circuit is provided including two input means and output means with, a first input connected to an output connection of said sweep voltage generator; a second input connected to a third output of said lock-on circuit; and with the output means of said flag control system circuit connected as an input to said aircraft radio transmitter-receiver distance measuring system for flaging a display location when some echo protection circuit failure occurs.

3. The echo false distance indication sensing and correcting circuit of claim 1, wherein said circuit means interconnecting said first signal coincidence means and said sweep voltage generating means includes a logic "or" circuit, and a voltage comparator circuit; and with said logic "or" circuit having a first signal input connection with an output connection of said first signal coincidence means; said voltage comparator having an input connection from an output of said sweep voltage generator; said voltage comparator circuit having an output connection as a second input to said logic "or" circuit; and with the output of said logic "or" circuit connected as an input to said sweep voltage generator.

4. The echo false distance indication sensing and correcting circuit of claim 1, wherein said first signal coincidence circuit, said sweep voltage generating means, and said circuit means interconnecting said first signal coincidence means and said sweep voltage generating means include: a first diode with cathode connected to said search to track signal connection and having an anode connection in common to the base of a first NPN transistor and the collector of a first PNP transistor; the collector of the first NPN transistor being connected to the base of the first PNP transistor; transistor biasing circuit means connected to the emitter of said first PNP transistor, the collector base connection between the two transistors, and to the emitter of said first NPN transistor; whereby, with application of a predetermined negative voltage level to the cathode of said first diode such current is pulled from the collector of said first PNP transistor to hold said first NPN transistor "off" since its base is then relatively negative.

5. The echo false distance indication sensing and correcting circuit of claim 4, wherein said biasing means includes, a first positive voltage supply connected through resistive means to ground and with a tap connection from said resistive means to the collector to base connection between said transistors; with the emitter of said first NPN transistor connected to ground; and an AC voltage supply connected through a first capacitor and a second diode, in parallel, and serially on through a second resistor and a second capacitor to ground; with the junction of said second diode, said first capacitor and said second resistor being connected through a third diode to the emitter of said first PNP transistor, whereby, with said first NPN transistor held in the nonconductive "off" state said second capacitor is charged positive by half-wave AC current from said AC supply through said second diode and said second resistor, and that when the charge on said second capacitor so rises that the voltage on the anode of said third diode exceeds the voltage on the collector of said first NPN transistor by substantially the drop across said third diode and the emitter base junction of said first PNP transistor, current will then flow through the first PNP transistor and said first diode in a restive state for the echo false distance sensing and correcting circuit.

6. The echo false distance indication sensing and correcting circuit of claim 5, wherein a second NPN transistor is included having a base connection to the junction of said second resistor and said second capacitor and also through a third resistor to a second positive voltage supply, a collector connection to said first positive voltage supply, and with said second positive voltage supply more positive than said first positive voltage supply; and with the emitter output of said second NPN transistor connected both to said voltage variable time delay generator and to the cathode of a first Zener diode and through this first Zener diode to ground.

7. The echo false distance indication sensing and correcting circuit of claim 6, wherein a fourth diode has a cathode connection to said search to track signal connection and an anode connection to the cathode of a fifth diode; said fifth diode has an anode connection both through a third capacitor to said transmitter trigger pulse connection and through a fourth resistor to ground; the junction of said fourth and fifth diodes being connected to the base of a third NPN transistor, through a fifth resistor to ground, through a sixth resistor and fourth capacitor, in parallel, both through a seventh resistor to said first positive voltage supply and as an output to said range gate generator; the emitter of said third NPN transistor is connected to ground; the collector of said third NPN transistor is connected both through an eighth resistor to the emitter output connection of said second NPN transistor and of said sweep voltage generating means, and through a fifth capacitor to the base of a fourth NPN transistor, also including, a base connection through a ninth resistor to said second positive voltage supply, an emitter connection to ground, an an output collector connection with the common connection of the fourth capacitor and the sixth and seventh resistors to said range gate generator.

8. The echo false distance indication sensing and correcting circuit of claim 7, wherein said range gate generator includes connection from said voltage variable time delay generator through a fifth capacitor to the base of a fifth NPN transistor with the base also connected through an eighth resistor to said first positive voltage supply, the emitter connected to ground, and the collector connected through a ninth resistor to said first voltage supply; and with the collector of said fifth NPN transistor connected as an output both to said first signal coincidence circuit and to said second signal coincidence circuit.

9. The echo false distance indication sensing and correcting circuit of claim 8, wherein said range gate output connection to said first signal coincidence circuit is to the common anode connective junction of sixth and seventh diodes; with the cathode of the sixth diode connected to said range gate signal pulse connection; and with the cathode of said seventh diode connected both through a tenth resistor to a negative power supply and to the common junction of the anode of said first diode, the base of said first NPN transistor, and the collector of said first PNP transistor.

10. The echo false distance indication sensing and correcting circuit of claim 9, wherein said second signal coincidence circuit is a capacity coupled AND circuit with coincident pulses required from two inputs to enable an output pulse; with eighth and ninth diodes having anodes connected as the AND circuit with a tenth diode having the cathode connected to the anode junction of said eighth and ninth diodes, and the anode connected to ground as a clamping diode; with the anode junction of said eighth and ninth diodes also connected through an eleventh resistor to said first positive voltage supply; with the cathode of said eighth diode connected both through a twelfth resistor to said negative voltage supply and through a sixth capacitor to the output of said range gate generator circuit; with the cathode of said ninth diode connected both through a thirteenth resistor to said negative voltage supply and through a seventh capacitor, as an input, to said decoded video pulse connection of said transmitter-receiver distance measuring system; and with the common junction of said eighth, ninth, and tenth diodes capacity coupled as an output from said second signal coincidence circuit and input through an eighth capacitor of said lock-on circuit.

11. The echo false distance indication sensing and correcting circuit of claim 10, wherein the input connection to said lock-on circuit is through said eighth capacitor to the control electrode of a silicon controlled rectifier with the control electrode connected through a fourteenth resistor to ground, the cathode connected to ground and the anode connected through a fifteenth resistor to the cathodes of both an eleventh and twelfth diodes and also through a ninth capacitor to ground; and with the anode of said twelfth diode connected as an output from the lock-on circuit back as an input to said sweep voltage generator to and through said first capacitor and said second diode, in parallel.

12. The echo false distance indication sensing and correcting circuit of claim 11, wherein the anode of said eleventh diode is connected both through a sixteenth resistor to said second positive voltage supply and as a signal path to the anode of and through a thirteenth diode to the base of a sixth NPN transistor, with the base also connected through a seventeenth resistor to ground, an emitter connection to ground, and a collector signal path connection to the junction of an eighteenth resistor and the cathode of a second Zener diode; the other end of the eighteenth resistor being connected to said first positive voltage supply, the anode of said Zener diode being connected through a nineteenth resistor to said negative voltage supply, and to the base of a seventh NPN transistor having an emitter connection to said negative voltage supply, and with a collector connector through a twentieth resistor to said first positive supply; the collector of said seventh NPN transistor also being connected to the anode of a fourteenth diode, and through the diode to and through a tenth capacitor to ground, and through serially a twenty-first resistor and a fifteenth diode to ground with the cathode of the fifteenth diode to ground, with the junction of the anode of the fifteenth diode and twenty-first resistor connected to the collector of the seventh NPN transistor; and with the common junction of the fourteenth diode, twenty-first resistor and tenth capacitor connected as a lock-on circuit signal output to the cathode of a sixteenth diode and through this diode to said inbound slew control connection of said radio transmitter-receiver distance measuring system.

13. The echo false distance indication sensing and correcting circuit of claim 12, wherein a flag control system circuit includes a connection from the collector of said seventh NPN transistor through first diode means within the flag control system circuit with the diode means cathode oriented toward the transistor collector connection therewith; and with an anode termination of said diode means being connected through a twenty-second resistor to said first voltage supply, and also connected through a twenty-third resistor and serially on through an eleventh capacitor to said negative voltage supply; with the junction of said twenty-third resistor and said eleventh capacitor connected to an anode connection of second diode means within said flag control circuit having a cathode connection to the base of a tenth NPN transistor, with the base connected through a twenty-fourth resistor to ground, and to a cathode connection of third diode means within said flag control circuit having an anode connection as an input to the flag control circuit back to the anode of said first Zener diode in said sweep voltage generator; and also with resistive means connected between the anode of said first Zener diode and ground; with said tenth NPN transistor having an emitter connection to ground; and also a collector output connection to a cathode connection of fourth diode means within said flag control circuit having an anode connection as the input to said aircraft transmitter-receiver distance measuring system for flaging a display location when same echo protection circuit failure occurs.

References Cited
UNITED STATES PATENTS 3,013,260   12/1961   Schwalbe  ---------- 343—7.3
3,316,548   4/1967   D'Amico  ---------- 343—7.3

RODNEY D. BENNETT, JR., Primary Examiner

T. H. TUBBESING, Assistant Examiner